United States Patent [19]

Senjo et al.

[11] Patent Number: 5,755,515
[45] Date of Patent: May 26, 1998

[54] ACTUATOR

[75] Inventors: Motohiro Senjo; Shigeru Sadotomo, both of Shimizu, Japan

[73] Assignee: IAI Corporation, Shizuoka, Japan

[21] Appl. No.: 546,132

[22] Filed: Oct. 20, 1995

[30] Foreign Application Priority Data

Oct. 20, 1994 [JP] Japan ............................. 6-282855

[51] Int. Cl.$^6$ .................................................. F16C 29/06
[52] U.S. Cl. ........................................................... 384/45
[58] Field of Search ............................ 384/45, 43, 44; 464/168

[56] References Cited

U.S. PATENT DOCUMENTS

| | | | |
|---|---|---|---|
| 4,869,600 | 9/1989 | Tonogai | 384/43 |
| 4,952,075 | 8/1990 | Rogers | 384/43 |
| 5,431,498 | 7/1995 | Lyon | 384/45 |

FOREIGN PATENT DOCUMENTS 1-188755  7/1989  Japan.

*Primary Examiner*—Lenard A. Footland
*Attorney, Agent, or Firm*—Sughrue, Mion, Zinn, Macpeak & Seas, PLLC

[57] ABSTRACT

An actuator comprises a base having a bottom wall and pair of side walls provided upright on right and left sides of the bottom wall, having a transverse cross section of an approximately U shape and formed by extrusion of a light metal or a light alloy; a slider provided inside the base in such a way as to be movable along the lengthwise direction of the base, made of the same type of light metal or light alloy as that of the base, and having a pair of return paths; a pair of base side grooves formed in inner surfaces of the pair of side walls of the base; a pair of slider side grooves formed in right and left side surfaces of the slider at positions corresponding to the pair of base side grooves, the slider side grooves having a same shape as the base side grooves; a pair of base rails of steel securely attached to the pair of base side grooves and having rolling body tracks; and a pair of slider rails of steel securely attached to the pair of slider side grooves and having rolling body tracks which communicate with the return paths via a pair of reversal caps.

8 Claims, 8 Drawing Sheets

ACTUATOR

BACKGROUND OF THE INVENTION

1. Field of the Invention

The present invention relates to an actuator which moves a slider, mounted on a base, in the proper direction by means of a rotary driver. More particularly, this invention relates to an actuator which is designed in such a way that most of the base and the slider which moves along the base are made of the same type of light metal or light alloy and only the part which is associated with the movement of a roller is made of steel

2. Description of the Related Art

One known actuator has the following structure. The actuator includes a servo motor whose output shaft is coupled via a coupling mechanism to a ball screw. The ball screw is engaged with a ball nut which is secured to the slider while its rotation is restricted. As the servo motor rotates in the proper direction, the ball screw turns in the same direction so that the ball nut and slider move in the proper direction.

The slider moves along the base, which is provided with a pair of guides. The slider is so arranged as to be movable between those guides. Each guide is formed with a groove. The slider also has a pair of grooves formed in association with the grooves of the guides. Return paths, which respectively communicate with the grooves of the slider, are also formed in the slider. A plurality of balls are retained as rolling bodies in a movable manner between those return paths and the guides' grooves and the slider's grooves. That is, as those balls roll and circulate, the slider moves along the pair of guides.

The slider and the base of the typical conventional actuator are both made of steel. FIG. 11 shows the structure of such an actuator. FIG. 11 is a transverse cross-sectional view essentially showing a base 101, a slider 103 and balls 105 of the conventional actuator. The base 101 is designed to have a recessed shape with a pair of guides 107 and 107. A groove 109 is formed in each guide 107. The slider 103 is formed with grooves 111 and 111 in association with those grooves 109. Return paths 113, which respectively communicate with the grooves 111, are formed on the right and left sides of the slider 103. The balls 105 are retained in the circulation paths 113.

The base 101 and the slider 103 are both made of steel, and those portions where the grooves 109 and the grooves 111 are formed are naturally made of steel. Steel is selected as the material for the portions where the balls 105 move in order to ensure the sufficient durability against the load of the moving slider 103 so that the actuator can maintain the reliable or stable performance over a long period of time.

With steel used for the base 101 and the slider 103, the overall apparatus becomes heavy. In addition, the load on the rotary driver including the servo motor for moving the steel slider 103 undesirably becomes larger.

Some proposals have been made to cope with the above weight problem. According to one proposal, both the base and slider are made of the same type of light metal, such as an aluminum alloy, or light alloy. Another proposal suggests the use of a light metal like an aluminum alloy or a light alloy for one of the base and slider. When the base and slider are both made of the same type of light metal, such as an aluminum alloy, or light alloys, however, their mechanical strength, particularly, the mechanical strength of the portions where the balls 105 roll decreases (because the allowable surface pressure of the portions where the balls 105 contact are low so that those portions cannot withstand the applied load). The actuator cannot therefore maintain the stable performance over a long period of time.

As a solution to the above problems, there has been proposed to use steel only for the portions where the balls roll to ensure the necessary mechanical strength while making most of the base of a light metal, such as an aluminum alloy, or a light alloy to reduce the overall weight of the actuator. This proposals is disclosed in, for example, Unexamined Japanese Patent Publication No. Hei 1-188755. The structure of this prior art is illustrated in FIG. 12. This actuator has a housing 201 which is nearly tubular in shape and is made of a light metal. This housing 201 is provided with a pair of guides 203 and 203 to which steel bearing strips 205 and 205 are respectively attached. The actuator further has a slider 207 which is formed with return paths 211 and 211 where balls 209 circulate.

As the housing 201 moves in the proper direction by means of a coupling member 213 and endless belt 214, the slider 207 moves in the proper direction along the bearing strips 205 of the guides 203 of the housing 201 while the balls 209 roll and circulate. In this case, the most of the housing 201 is made of a light metal and only the portions which are associated with the rolling of the balls 209, namely the bearing strips 205, are made of steel.

Unexamined Japanese Patent Publication No. Hei 1-1188755 describes a material only for the housing 201 whereas it is expected that the slider 207 is made of steel too, though not specifically discussed, in view of the required mechanical strength at the time the balls 209 roll.

The above-described prior art structures however suffer the following shortcomings. When the base 101 and the slider 103 are made entirely of steel as in the case of FIG. 11, the actuator becomes heavier and thus suffers the increased weight and the slower operational speed. When the base 101 and the slider 103 are made entirely of a light metal, such as an aluminum alloy, or a light alloy, the mechanical strength of the portions which are associated with the rolling of the balls 105 drops so that the stable performance of the actuator cannot be maintained over a long period of time.

With regard to the prior art illustrated in FIG. 12, as the bearing strips 205 are made of steel, it expected that the slider 207 is also made of steel because it is unlikely that the slider 207 is made of a light metal in light of the surface pressure at the time the balls 209 roll. When the base 201 is made of a light alloy, however, the span (the centre distance of the balls 209) cannot be set large due to thermal expansion. The structure of FIG. 12 is probably designed in view of such a problem because the span (the centre distance of the balls 209) is set small. When the load in the rolling direction is applied to the slider 207, the narrow span makes the load on the orbital paths greater due to the "lever effect" so that this portion is easily deformable. This impairs the stable performance of the actuator.

In the structure shown in FIG. 12, the bearing strips 205 are attached to the guides 203 in an inclined manner as illustrated, this structure is not so strong against loads in the backward radial direction (pulling direction) and the pitching direction. It is therefore likely that the stable performance of this apparatus is impaired.

The structure shown in FIG. 12 should face another problem. As shown in FIG. 12, the transverse cross section of the housing 201 has an approximately C shape with side walls 201a and 201b rising high and upright. The portions where the bearing strips 205 are provided are located at the upper portions of the side walls 201a and 201b. When some load is applied to the slider 207, the rolling and circulation of a plurality of balls cause a large load to act on the relatively upper portions of the side walls 201a and 201b via the bearing strips 205 and 205. As a result, a large bending moment may be produced to deform the side walls 201a and 201b considerably. This means that the load on the slider 207 is limited (the weights and the load moments or the like of various devices to be mounted on the slider 207 are restricted).

FIG. 13 shows the deformation of the structure shown in FIG. 12. As shown in FIG. 13, the pair of side walls 201a and 201b of the base 201 are spread leftward and rightward. It appears that because the base 201 receives the load via the bearing strips 205 located at the relatively upper portions of the side walls 201a and 201b, a relatively large bending moment is produced, thus causing the illustrated deformation.

SUMMARY OF THE INVENTION

Accordingly, it is an object of the present invention to provide an actuator which can maintain the mechanical strength of the portions associated with the rolling of rolling bodies, can be designed lighter with an improved operational speed, and can increase the centre distance of the rolling bodies by eliminating the shortcomings originating from the thermal expansion to thereby improve the moment rigidity.

To achieve this object, an actuator according to this invention comprises a base having a bottom wall and a pair of side walls provided upright on right and left sides of the bottom wall, having a transverse cross section of an approximately U shape and formed by extrusion of a light metal or a light alloy; a slider provided inside the base in such a way as to be movable along the lengthwise direction of the base, made of the same type of lighter than steel metal or light alloy as that of the base, and having a pair of return paths; a pair of base side grooves formed in inner surfaces of the pair of side walls of the base; a pair of slider side grooves formed in right and left side surfaces of the slider at positions corresponding to the pair of base side grooves, the slider side grooves having a same shape as the base side grooves; a pair of base rails of steel securely attached to the pair of base side grooves and having rolling body tracks; and a pair of slider rails of steel securely attached to the pair of slider side grooves and having rolling body tracks which communicate with the return paths via a pair of reversal caps.

The pair of base side grooves may be provided at such positions that a distance (L1) from a top surface of the bottom wall of the base to a center of the base side grooves in a height direction is equal to or smaller than a thickness (D1) of the side walls of the base.

The base side grooves may have a width (B) in a height direction greater than a depth (H) thereof and have a rectangular lateral cross section.

The corner portions of boundaries between the bottom wall of the base and the pair of side walls may have inclined surfaces.

It is preferable that the pair of base rails and the pair of slider rails be formed by grinding or plasticity rolling processing, the rolling body tracks be formed at predetermined positions by a heat treatment and a hardening process, the base rails and the slider rails be securely fitted in the base side grooves and the slider side grooves in such a situation, and the rolling body tracks be ground to have a transverse cross-sectional shape of a Gothic style arch.

The light metal or light alloy may be an aluminum alloy, magnesium alloy or titanium alloy.

The bottom wall of the base may have a hollow portion to become lighter and have a higher rigidity.

Rolling bodies may be balls.

With the balls in use, a thickness (D2) of the base rails may be set smaller than a diameter (D3) of the balls as the rolling bodies and equal to or less than 10% of a centre distance of rolling of the balls, and a width (B) of the base rails may be set equal to or smaller than twice the diameter (D3) of the balls.

According to this invention, the base and the slider are made of the same type of light metal or light alloy to reduce the weight of the actuator. Further, the base side grooves and slider side grooves are respectively formed in the base and the slider, the base rails and slider rails of steel which have the rolling body tracks are securely fitted in those base side grooves and slider side grooves to keep the required mechanical strength of the portions where the rolling bodies roll and to prevent the occurrence of the thermal-expansion oriented shortcomings.

When the pair of base side grooves are provided in such a way that their lengths from the top surface of the bottom wall of the base is equal to or smaller than the thickness of the base side walls, the point of application of the load on the base at the time the rolling bodies roll is set relatively lower, thus suppressing the deformation of the base caused by the bending moment produced by the applied load.

When the base side grooves have a rectangular cross section such that the width of the side grooves is greater than the depth thereof, it becomes easier to process (or manage the dimensions of) the base side grooves and the base rails, thus ensuring the high-precision fitting of the base rails in the base side grooves. The same is true of the slider side.

When the corner portions of the boundaries between the bottom wall of the base and the pair of side walls have inclined surfaces, it is possible to suppress the stress concentration on the corner portions.

Further, the influence of parallelism error caused by the working and assembling of the rails and grooves can be eliminated to improve the precision such as the parallelism of the orbital grooves by forming the pair of base rails and the pair of slider rails by grinding or plasticity rolling processing, forming the rolling body tracks at predetermined positions by a heat treatment and a hardening process, securely fitting the base rails and the slider rails in the base side grooves and the slider side grooves in such a situation, and then grinding the rolling body tracks. When the transverse cross section of the rolling body tracks have a shape of a Gothic style arch, the area which receives the load can be limited only to the vicinity of the rolling body tracks.

DETAILED DESCRIPTION OF THE PREFERRED EMBODIMENT

Figure 1:
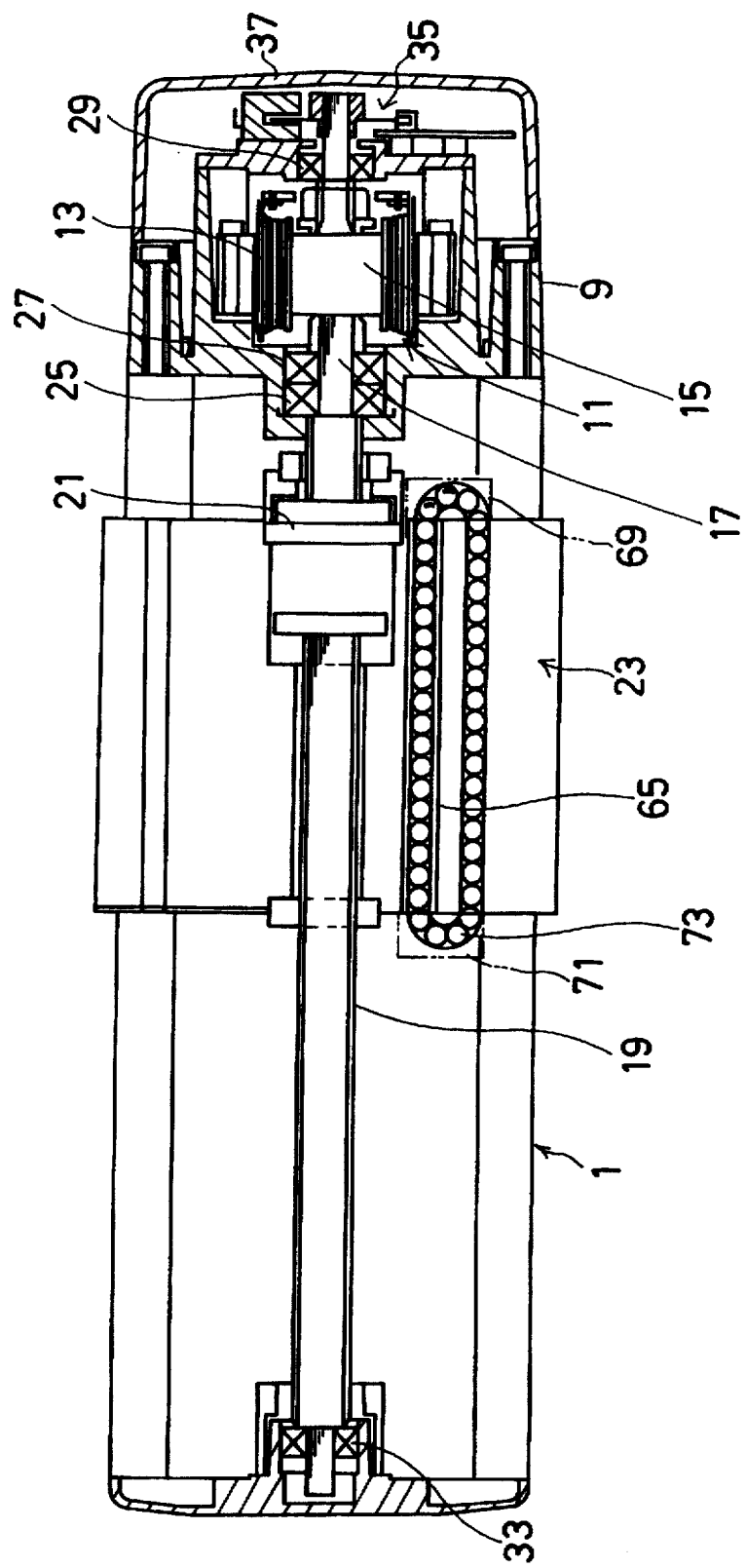
FIG. 1 is a partly cutaway plan view of an actuator according one embodiment of this invention.

One embodiment of the present invention will now be described with reference to FIGS. 1 through 10. As shown in FIG. 3, a base 1 has an approximately U-shaped lateral cross section, and includes a bottom wall 1a and a pair of side walls 1b and 1c provided upright on the left and right sides of the bottom wall 1a. The base 1 is formed by extrusion of a light metal or a light alloy such as an aluminum alloy to reduce its weight. The bottom wall 1a is designed to be hollow as shown in FIG. 3 to increase the rigidity as well as to reduce the weight. The hollow portions of the bottom wall 1a are indicated by reference numerals "3" and "5" in the diagram. The corner portions of the boundaries between the bottom wall 1a and the side walls 1b and 1c have inclined surfaces 1d and 1e to reduce the stress concentration there. The light metal or light alloy may be a magnesium alloy, titanium alloy or the like besides an aluminum alloy.

Figure 2:
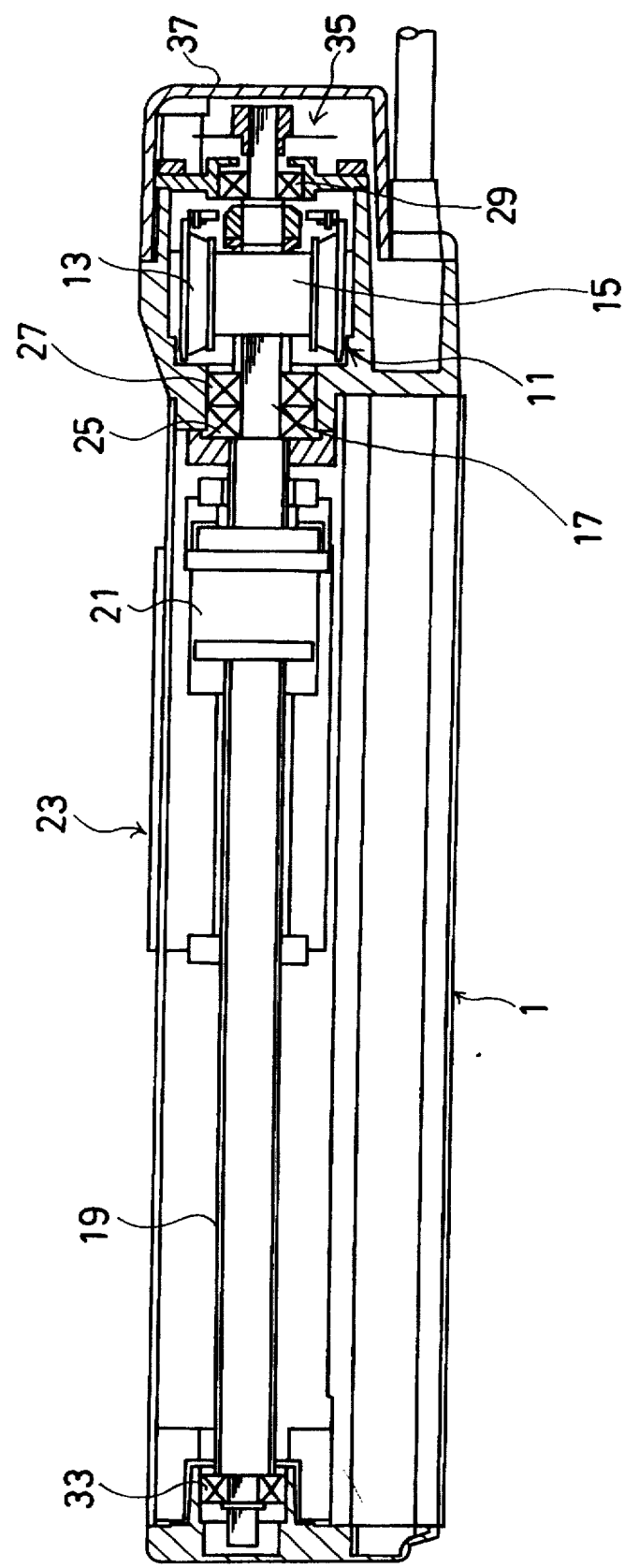
FIG. 2 is a side cross-sectional view of the actuator of this embodiment.
Figure 3:
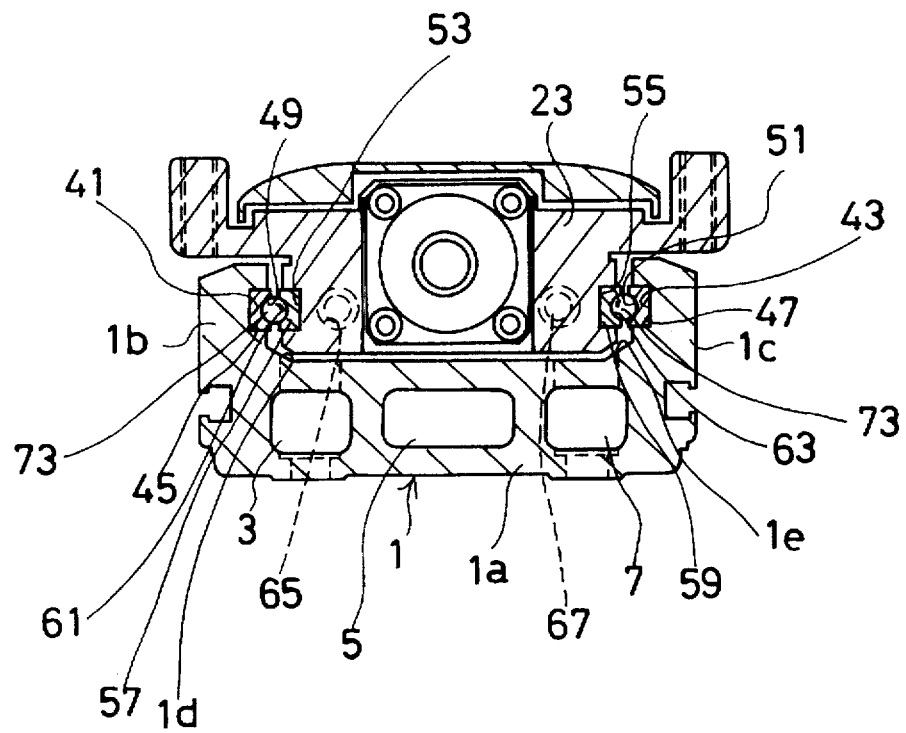
FIG. 3 is a transverse cross-sectional view of the actuator of this embodiment.

As shown in FIGS. 1 and 2, the base 1 is designed as an elongated object with a predetermined length, and a housing 9 is coupled to the right end of the base 1 in FIG. 1. Accommodated in this housing 9 is a servo motor 11 as a rotary driver. The servo motor 11 comprises a stator 13 located on the inner peripheral side of the housing 9 and a rotor 15 rotatably retained inside the stator 13. The rotor 15 is secured to an output shaft 17 which is designed integral with a ball screw 19. The ball screw 19 is provided at the outer peripheral portion of the output shaft 17 in FIG. 1.

A ball nut 21 is engaged with the ball screw 19 with its rotation restricted. A slider 23 is integrally secured to the ball nut 21. Various devices (not shown) are to be mounted on this slider 23. The slider 23, like the base 1, is made of an aluminum alloy to significantly contribute to reducing the weight of the actuator. The output shaft 17 is supported on both sides of the servo motor 11 by bearings 25 and 27 and a bearing 29 in such a way as to be rotatable on both sides. The output shaft 17 is also rotatably supported at the left end of the base 1 in FIG. 1 by a bearing 33. Provided on the right side of the bearing 29 in FIG. 1 is detection means 35 which detects the amount of rotation of the servo motor 11. A cover 37 is securely fitted over the right end of the housing 9 in FIG. 1.

Figure 4:
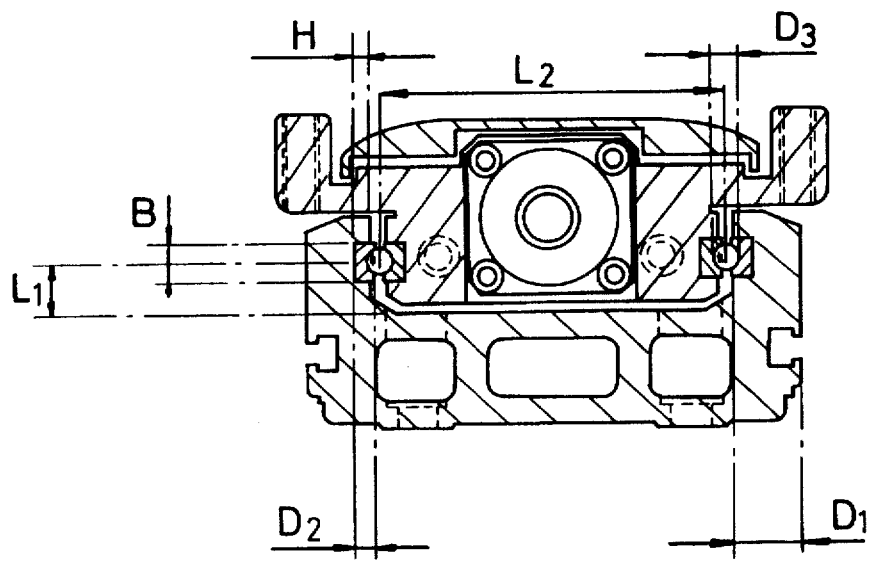
FIG. 4 is a transverse cross-sectional view of the actuator of this embodiment for explaining the dimensional relationship between a base and the individual components of a slider.

The structures of the base 1 and the slider 23 will now be described in detail with reference to FIGS. 3 and 4. The basic structure of the base 1 has already been described above. Base side grooves 41 and 43 are respectively formed in the inner surfaces of the pair of side walls 1b and 1c. Those base side grooves 41 and 43 have a rectangular lateral cross section. The base side grooves 41 and 43 are formed at such positions that the distance from the top surface of the bottom wall 1a of the base 1 is equal to or smaller than the thickness (D1) of the side walls 1b and 1c, as shown in FIG. 4. Given that the distance from the top surface of the bottom wall 1a of the base 1 to the center of the each base side groove 41 or 43 is L1, this distance L1 and the thickness D1 have a relationship expressed by the following equation (I).

$$L1 \leq D1 \qquad (I)$$

This structure is employed so that as the base side grooves 41 and 43 are provided at as a position as possible in the height direction of the side walls 1b and 1c, the bending moment produced by the applied load at the time balls 73 as rolling bodies roll, thus suppressing the deformation of the side walls 1a and 1b of the base 1 as much as possible. Further, the width B and depth H of the base side grooves 41 and 43 have a relationship expressed by the following equation (II), i.e., the width B is greater than the depth H.

$$B > H \qquad (II)$$

Base rails 45 and 47 of steel are respectively secured to the base side grooves 41 and 43. Rolling body tracks 49 and 51 where balls 73 roll are respectively formed in the base rails 45 and 47. Those base rails 45 and 47 are constructed through the following processes. First, the base rails 45 and 47 are formed by grinding or plasticity rolling processing, and the rolling body tracks 49 and 51 are formed at predetermined positions by a heat treatment and a hardening process. Under this condition, the base rails 45 and 47 are securely fitted in the base side grooves 41 and 43. Then, the rolling body tracks 49 and 51 are ground to have a transverse cross-sectional shape of a Gothic style arch.

There are various ways to effect the secured fitting of the base rails 45 and 47. One way is to set the width of the base rails 45 and 47 slightly larger than the width of the base side grooves 41 and 43 and press-fit the former into the latter. Another way is to set the width of the base rails 45 and 47 slightly smaller than the width of the base side grooves 41 and 43, insert the base rails 45 and 47 into the grooves 41 and 43 and securely attach both by means of an adhesive. Alternatively, after the insertion of the base rails 45 and 47, the distal end portions of the base side grooves 41 and 43 are clamped to securely attach the base rails 45 and 47 to the base side grooves 41 and 43.

Further, the thickness D2 of the base rails 45 and 47 are set smaller than the diameter D3 of the balls 73 as the rolling bodies and are set equal to or less than 10% of the centre distance of rolling of the balls 73, and the width B of the base rails 45 and 47 (which is substantially the same as the width B of the base side grooves 41 and 43 and is thus indicated by the same reference symbol "B") is set equal to or smaller than twice the diameter D3 of the balls 73. That is, the relationship expressed by the following equations (III), (IV) and (V) is satisfied.

$$D2 < D3 \qquad (III)$$

$$D2 < 0.1 \times L2 \qquad (IV)$$

$$B \leq 2 \times D3 \qquad (V)$$

A pair of slider side grooves 53 and 55 are respectively formed on the left and right sides of the slider 23. Those slider side grooves 53 and 55 are located at the positions corresponding to the base side grooves 41 and 43, and have the same shape and the same size as the base side grooves 41 and 43. Slider rails 57 and 59 are securely press-fitted in the slider side grooves 53 and 55. Rolling body tracks 61 and 63 are formed in the respective slider rails 57 and 59. Those slider rails 57 and 59 are constructed through the same processes as the base rails 45 and 47.

A pair of return paths 65 and 67 are formed on the left and right sides of the slider 23. The rolling body track 61 of the slider rail 57 is associated with the return path 65, and reversal caps 69 and 71 of resin are attached to both ends of the circulation path 65. A plurality of balls 73 as the rolling bodies roll and circulate in a circulation path which is defined by the rolling body track 61, the return path 65, and the reversal caps 69 and 71. Likewise, the rolling body track 63 of the slider rail 59 is associated with the return path 67, and reversal caps 69 and 71 of resin are attached to both ends of the circulation path 67. The balls 73 as the rolling bodies roll and circulate in a circulation path which is defined by the rolling body track 63, the return path 67, and the reversal caps 69 and 71.

This embodiment can have the following advantages. First, since most of the base 1 and the slider 23 are made of aluminum and only the portions where the balls 73 roll, i.e., the base rails 45 and 47 and the slider rails 57 and 59, are made of steel, the overall actuator can be made lighter. It is therefore possible to reduce the capacity of the rotary driver and to easily increase the operational speed of the rotary driver.

As the portions which are associated with the rolling of the balls 73 are made of the same material on the base (1) side and the slider (23) side, thus eliminating the occurrence of the thermal-expansion oriented problems.

As the portions which are associated with the rolling of the balls 73 are the steel base rails 45 and 47 and the steel slider rails 57 and 59, their mechanical strengths are high enough to ensure the stable performance over a long period of time.

Since the base side grooves 41 and 43 are provided at relatively lower portions of the side walls 1b and 1c of the base 1 in the height direction thereof, the load acts at relatively lower portions of those side walls 1b and 1c at the time the balls 73 roll. The bending moment produced on the side walls 1b and 1c by the applied load thus become smaller so that the deformation of the base 1 can be suppressed as much as possible.

Because the thickness D2 of the base rails 45 and 47 are set smaller than the diameter D3 of the balls 73 as the rolling bodies and are set equal to or less than 10% of the centre distance L2 of rolling of the balls 73, it is possible to reduce the influence of a dimensional change, caused by the difference in thermal expansion between aluminum and steel in accordance with a change in the environmental temperature, on the performance. The same is true of the slider side.

As the base side grooves 41 and 43 and the slider side grooves 53 and 59 are designed to have a rectangular shape, it becomes easier to process (or manage the dimensions of) the base side grooves 41 and 43 and the base rails 45 and 47, thus ensuring the high-precision fitting of the base rails 45 and 47 in the base side grooves 41 and 43. The same is true of the slider side.

The bottom wall 1a of the base 1 has a hollow shape with the hollow portions 3, 5 and 7 to thereby significantly contribute to reducing the weight of the actuator and improve the rigidity.

As the corner portions of the boundaries between the bottom wall 1a of the base 1 and the pair of side walls 1b and 1c have the inclined surfaces 1d and 1e, it is possible to suppress the stress concentration on the corner portions.

Figure 5:
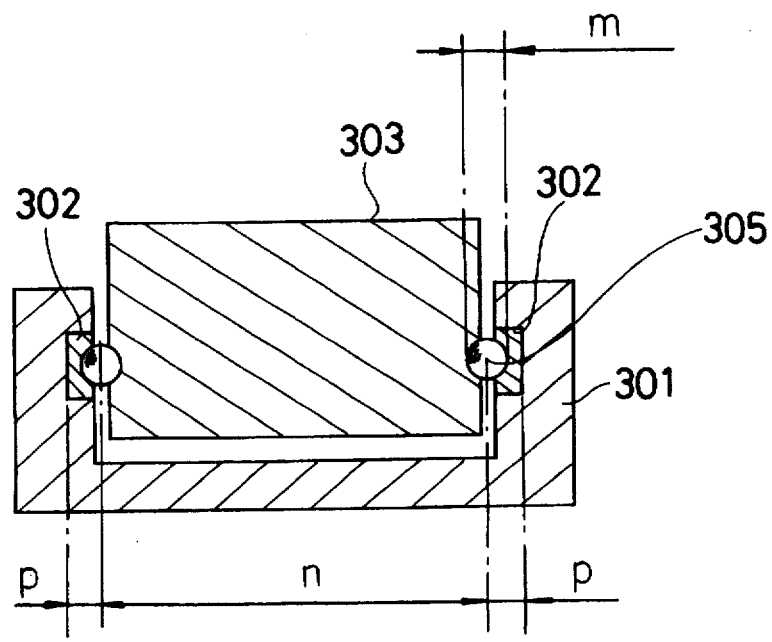
FIG. 5 is a transverse cross-sectional view of an actuator according to a comparative example for explaining a deformation caused by thermal expansion.
Figure 12:
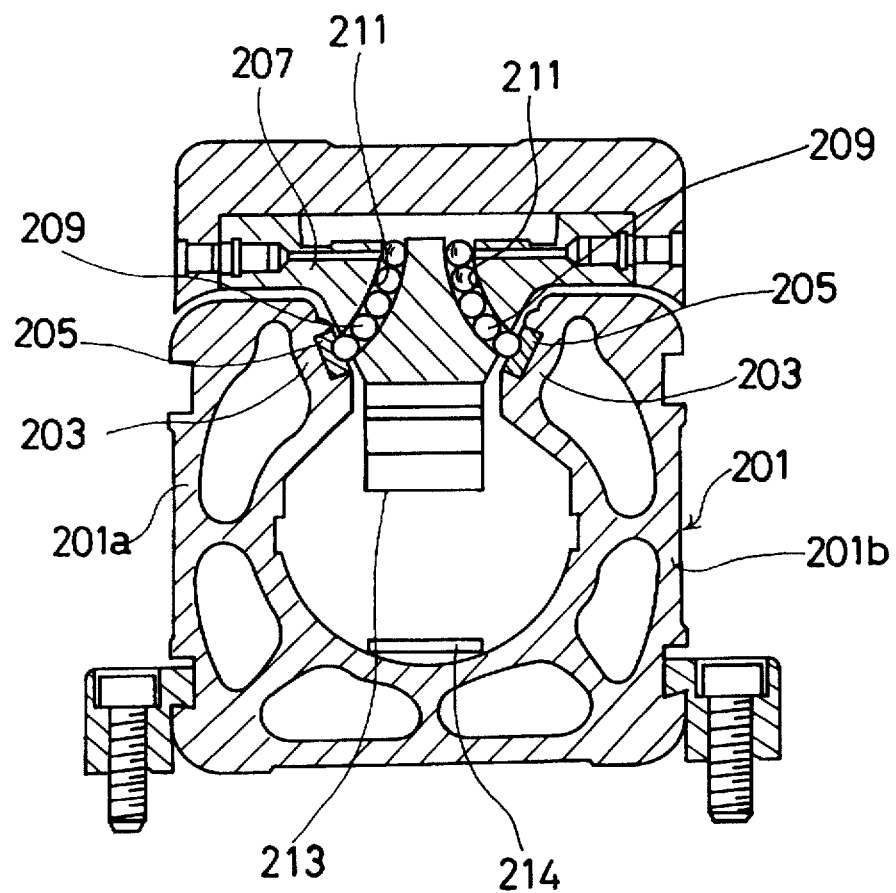
FIG. 12 is a transverse cross-sectional view of an actuator according to another prior art.
Figure 13:
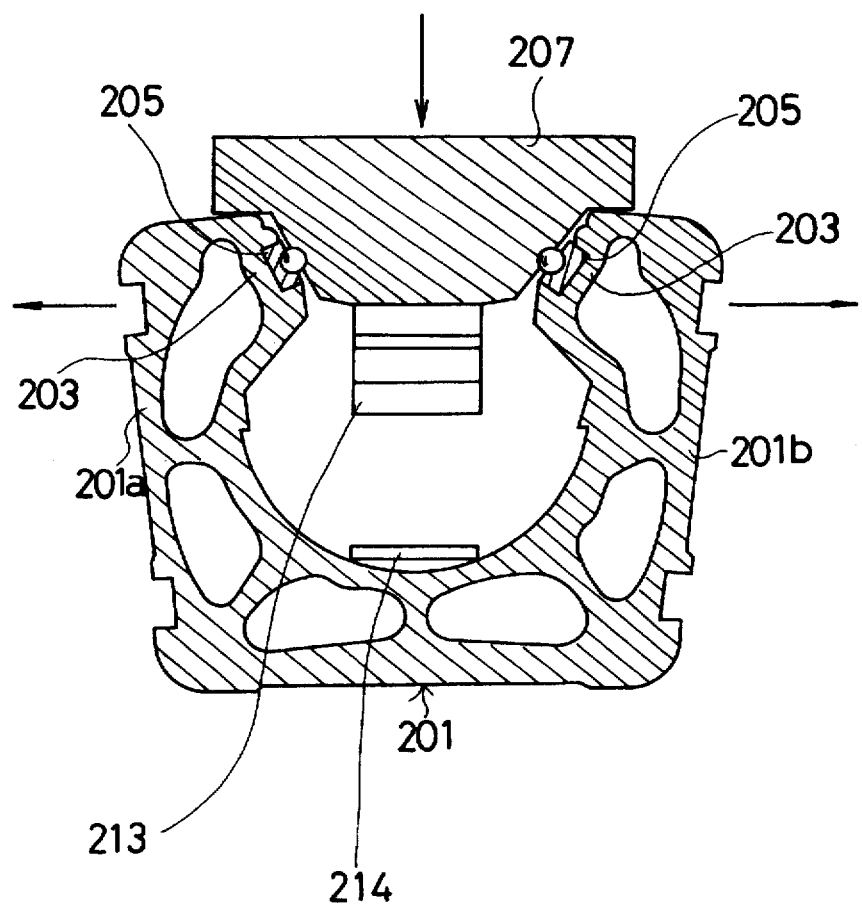
FIG. 13 is a diagram of the prior art in FIG. 12 showing how the structure shown in FIG. 12 deforms.

An example of the computation on how much deformation the thermal expansion actually causes will now be explained by the comparison with a comparative example of the prior art. The structure of this comparative example is shown in FIG. 5. The illustrated comparative example corresponds to the structure in FIG. 12 which has been discussed earlier in the section of the Related Art. A base 301 is made of an aluminum alloy and steel base rails 302 are attached to the base 301. A slider 303 and balls 305 are made of steel. The diameter of the balls 305 is 3.175 mm and the centre distance thereof is 60 mm. The distance from the center of the ball 305 to the outer end of the associated base rail 302 is 3.2 mm.

The thermal expansion coefficient of an aluminum alloy is $23.6 \times 10^{-6}$ (1/K), and the thermal expansion coefficient of steel is $10.7 \times 10^{-6}$ (1/K). It is also assumed that the ambient temperature has changed by 20° C.

With regard to the comparative example in FIG. 5, the dimension between the bottoms of the grooves of the base 301 (the distance between the outside ends of the pair of base rails 302) is changed by $\Delta L'$, which is given by the following equation.

$$\begin{aligned} \Delta L' &= (60 + 2 \times 3.2) \times 23.6 \times 10^{-6} \times 20 \\ &= 0.0313 \text{ mm} \end{aligned}$$

With regard to the slider 303 and the balls 305, as opposed to the above case, the dimension between the bottoms of the grooves of the base 301 (the distance between the outside ends of the pair of base rails 302) is changed by $\Delta L$, which is given by the following equation.

$$\begin{aligned} \Delta L &= (60 + 2 \times 3.2) \times 10.7 \times 10^{-6} \times 20 \\ &= 0.0142 \text{ mm} \end{aligned}$$

Therefore, the following difference occurs between the change $\Delta L'$ for the base 301 and the change $\Delta L$ for the slider 303 and balls 305.

0.0313−0.0142=0.0171 mm

In general, the intervals between the balls 305 and the grooves should be controlled on the order of several μm. When there is a displacement difference of 0.0171 mm, therefore, the proper function may not be maintained.

Figure 6:
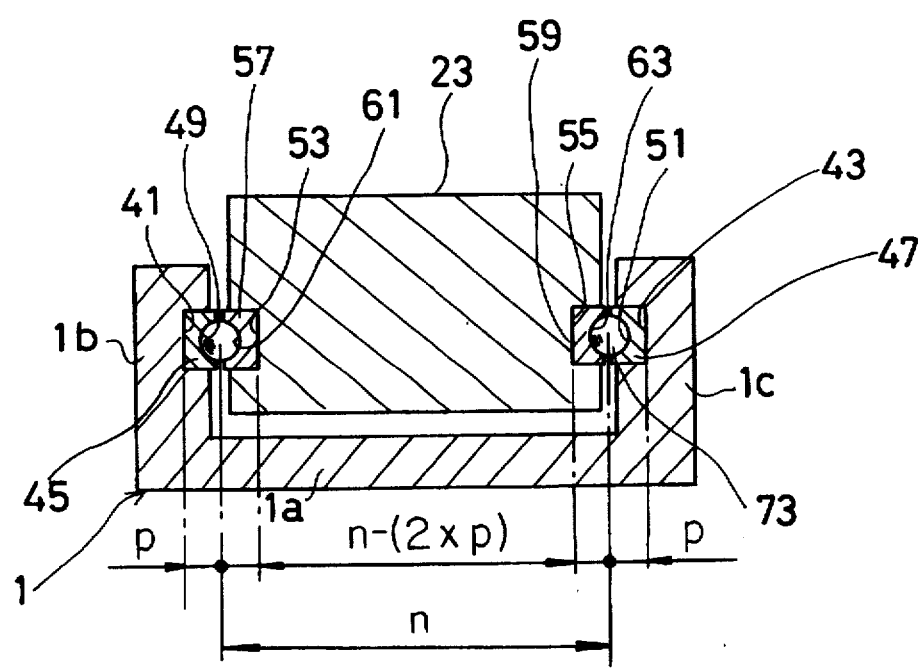
FIG. 6 is a transverse cross-sectional view showing the actuator of this embodiment for explaining a deformation caused by thermal expansion.

According to this embodiment as compared with the above example, the following values are involved. As shown in FIG. 6, the dimension between the bottoms of the grooves of the base 301 is changed by $\Delta L'$, which is given by the following equation.

$$\begin{aligned} \Delta L' &= (60 + 2 \times 3.2) \times 23.6 \times 10^{-6} \times 20 \\ &= 0.0313 \text{ mm} \end{aligned}$$

This is the same as that of the comparative example.

With regard to the slider 303 and the balls 305, there is a dimensional change $\Delta L$, which is given by the following equation.

$$\Delta L = (60 - 2 \times 3.2) \times 23.6 \times 10^{-6} \times 20 +$$
$$(4 \times 3.2) \times 10.7 \times 10^{-6} \times 20$$
$$= 0.0280 \text{ mm}$$

Therefore, the following difference occurs between the change ΔL' for the base 301 and the change ΔL for the slider 303 and balls 305. 0.0313−0.0280=0.0033 mm In other words, the dimensional change falls within ±3.3 μm with respect to a temperature change of ±20° C. so that the proper function can be maintained under the normal change in the environmental temperature.

Figure 7:
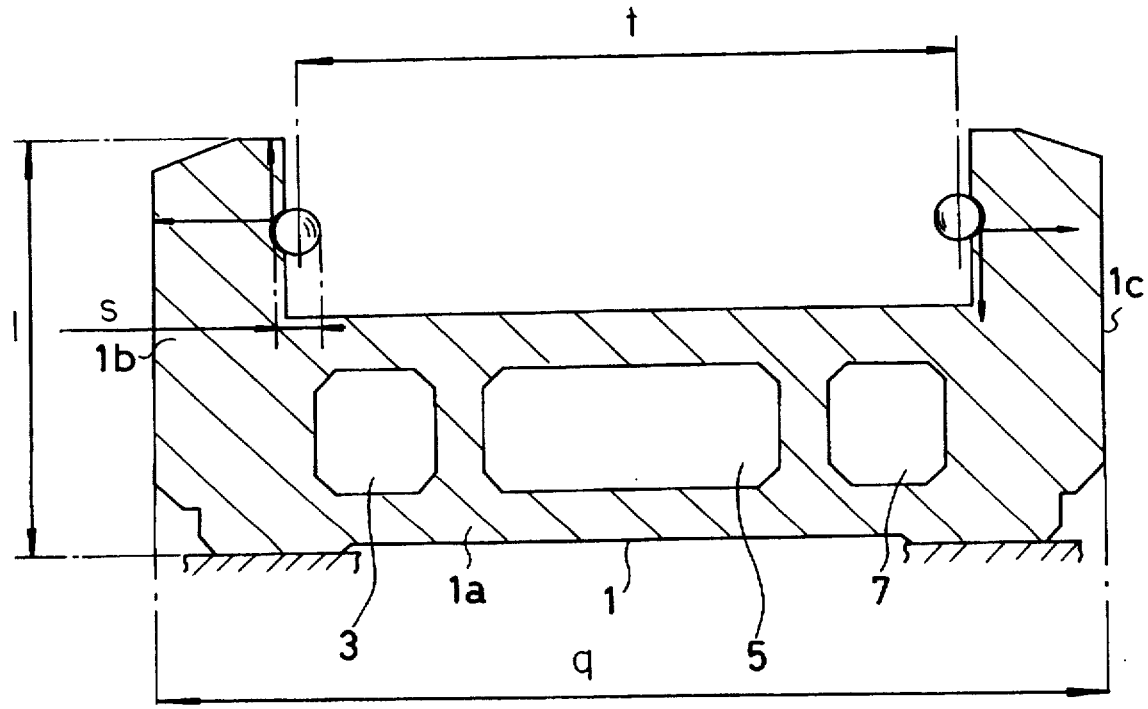
FIG. 7 is a transverse cross-sectional view of the base of a comparative example for explaining how stress concentration occurs at the boundaries between the bottom wall of the base and a pair of side walls due to the application of the load.
Figure 8:
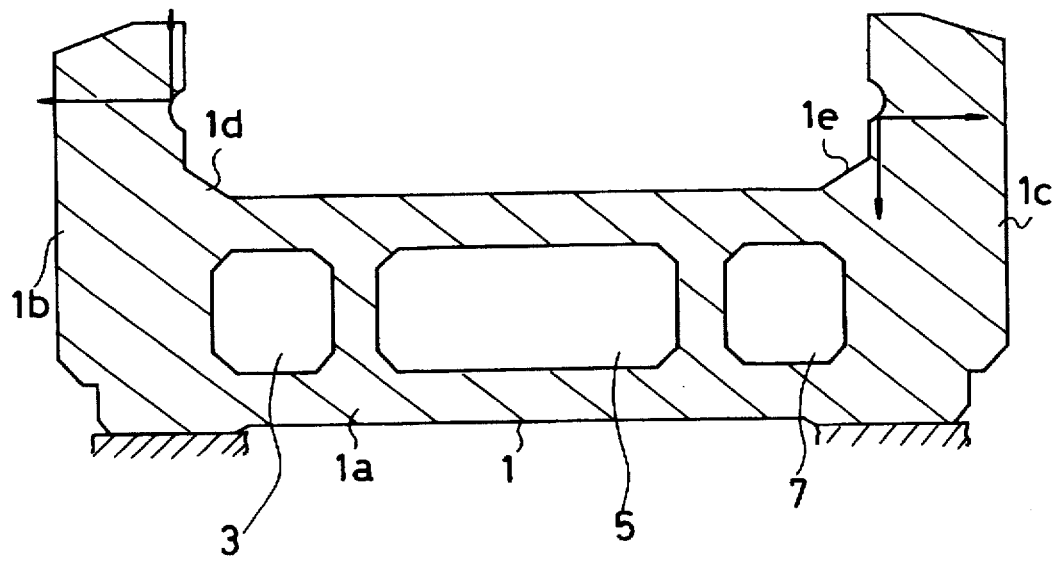
FIG. 8 is a transverse cross-sectional view of the base of this embodiment for explaining how stress concentration occurs at the boundaries between the bottom wall of the base and a pair of side walls due to the application of the load.

A description will now be given of how stress concentration on the boundaries between the bottom wall 1a of the base 1 and the pair of side walls 1b and 1c is suppressed, with reference to FIGS. 7 through 10. FIG. 7 is a diagram showing a comparative example for this embodiment, in which the boundaries between the bottom wall 1a and the pair of side walls 1b and 1c are designed to have right angles. FIG. 8 illustrates the structure of the base 1 according to this embodiment which has the inclined surfaces 1d and 1e at the boundaries between the bottom wall 1a and the side walls 1b and 1c as already discussed earlier.

FIGS. 7 through 10 are presented for explaining the effect of the inclined surfaces 1d and 1e, and the other illustrated parts, e.g., the base side grooves, have different structures as those of this invention.

How stress is concentrated on the boundaries between the bottom wall 1a and the side walls 1b and 1c was analyzed for both the comparative example shown in FIG. 7 and this embodiment shown in FIG. 8.

The analysis was conducted by the definite-element analysis, and the following are the dimensions of the base 1 and the balls shown in FIGS. 7 and 8.

Width of base 1: 120 mm
Height of base 1: 54 mm
Diameter of balls: 6.35 mm
Centre distance of balls: 84 mm Further, the bottom surface of the base 1 is secured and the load is applied to the rolling body tracks in the right and left directions and the up and down directions. The load in this case was 1 kgf per 1 mm in the lengthwise direction of the base 1. Further, the load acts on the left side of the base 1 leftward from the inside, and acts on the right side in such a way as to be spread rightward. A unit load equivalent to the upward rolling moment and a unit load equivalent to the downward rolling moment are respectively applied to the left side and the right side of the base 1 at the same time.

Figure 9:
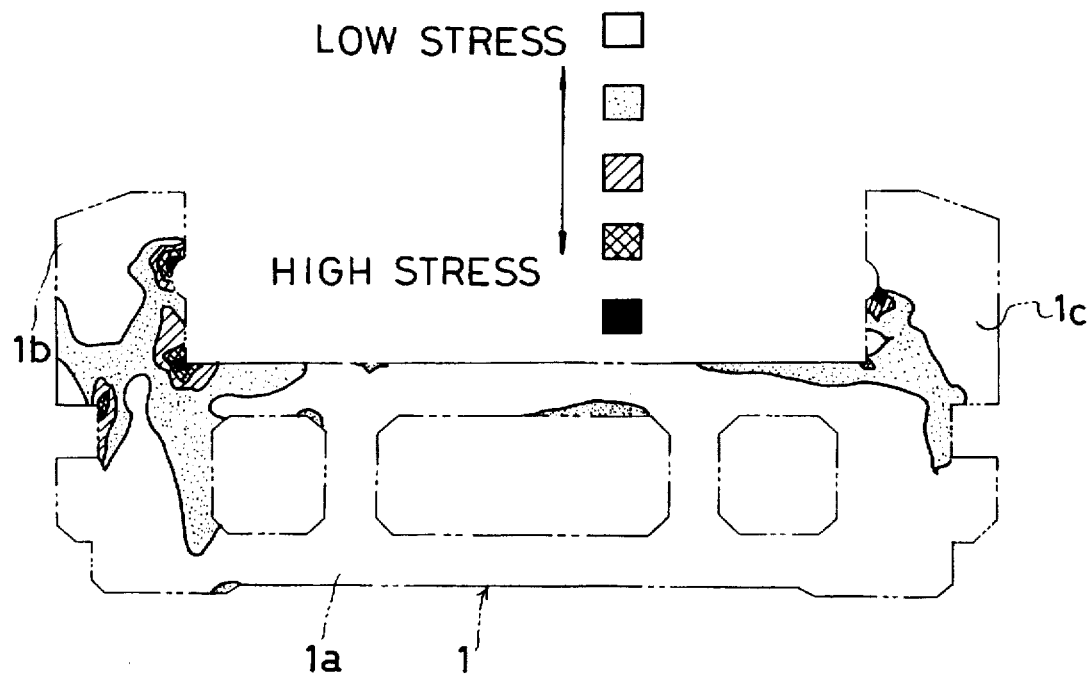
FIG. 9 is a diagram showing how stress is produced in the case of the comparative example shown in FIG. 7.
Figure 10:
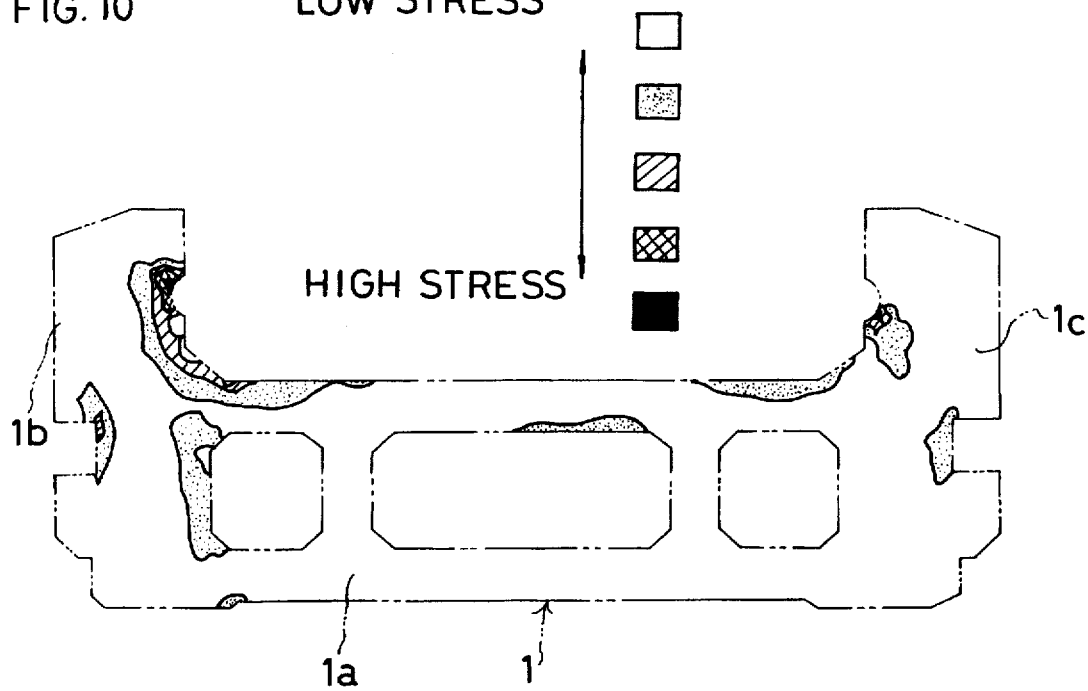
FIG. 10 is a diagram showing how stress is produced in the case of this embodiment shown in FIG. 8.
Figure 11:
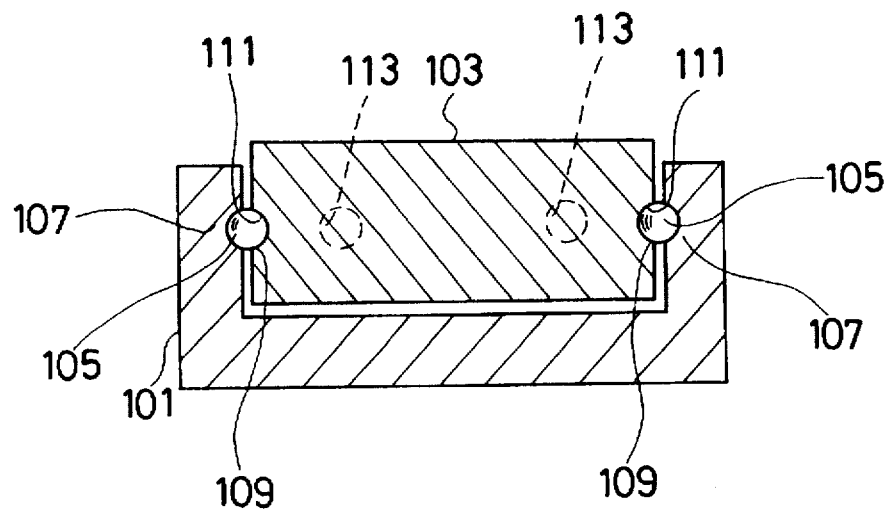
FIG. 11 is a transverse cross-sectional view of an actuator according to one prior art.

The results are illustrated in FIGS. 9 and 10. FIG. 9 shows the stress concentration in the comparative example, while FIG. 10 shows the stress concentration in this embodiment. It is supposed that the stress on the black part is the highest in FIGS. 9 and 10 and the stress gradually becomes smaller toward the white area. It is apparent from FIGS. 9 and 10 that a large stress concentration occurred at the boundaries between the bottom wall 1a and the side walls 1b and 1c in the comparative example, whereas such stress concentration is effectively suppressed in this embodiment. It is also understood that the stress produced inside the base 1 is suppressed.

This invention is not limited to the above-described embodiment, but may be modified in various other manners within the scope of the invention. For example, although an aluminum alloy is used as a light metal or light alloy in the above-described embodiment, all available light metals or light alloys may be used to reduce the weight of the actuator. The basic structure of the actuator is not limited to the illustrated mechanism which is a ball-screw and ball-nut type. For instance, this invention may also be adapted for an actuator which drives the slider by a belt and pulleys. In the case where the base and the slider are made of the same type of light metal or light alloy, the same type means not only the use of the exact material but also the use of the same material, e.g., an aluminum alloy, with slightly different composition.

What is claimed is:

1. An actuator comprising:
    a base having a bottom wall and a pair of side walls provided upright on right and left sides of said bottom wall, having a transverse cross section of an approximately U shape, said base being made of a metal or allow which is lighter than steel;
    a slider provided inside said base in such a way a to be movable along a lengthwise direction of said base, made of a same type of metal or alloy as that of said base, and having a pair of return paths;
    a pair of base side grooves formed in inner surfaces of said pair of side walls;
    a pair of slider side grooves formed in right and left side surfaces of said slider at positions corresponding to said pair of base side grooves, said slider side grooves having substantially the same shape as said base side grooves;
    a pair of base rails of steel securely attached to said pair of base side grooves and having rolling body tracks; and
    a pair of slider rails of steel securely attached to said pair of base side grooves and having rolling body tracks; and
    a pair of slider rails of steel securely attached to said pair of slider side grooves and having rolling body tracks which communicate with said return paths via a pair of reversal caps,
    wherein said pair of base side grooves are provided at such positions that a distance (L1) from a top surface of said bottom wall of said base to a center of said base side grooves in a height direction is equal to or smaller than a thickness (D1) of said side walls of said base.

2. The actuator as claimed in claim 1, wherein said bottom wall of said base has a hollow portion.

3. The actuator as claimed in claim 1, wherein said base side grooves have a width (B) in a height direction greater than a depth (H) thereof and have a rectangular lateral cross section.

4. The actuator as claimed in claim 1, wherein said corner portions of boundaries between said bottom wall of said base and said pair of side walls have inclined surfaces.

5. The actuator as claimed in claim 1, wherein said pair of base rails and said pair of slider rails are formed by grinding or plasticity rolling processing, said rolling body tracks are formed at predetermined positions by a heat treatment and a hardening process, said base rails and said slider rails are securely fitted in said base side grooves and said slider side grooves in such a situation, and said rolling body tracks are ground to have a transverse cross-sectional shape of a Gothic style arch.

6. The actuator as claimed in claim 1, wherein said metal or alloy is one of an aluminum alloy, magnesium alloy and titanium alloy.

7. The actuator as claimed in claim 1, wherein rolling bodies are balls.

8. The actuator as claimed in claim 7, wherein a thickness (D2) of said base rails is set smaller than a diameter (D3) of said balls as said rolling bodies and equal to or less than 10% of a centre distance of rolling of said balls, and a width (B) of said base rails is set equal to or smaller than twice said diameter (D3) of said balls.

* * * * *